United States Patent [19]

Ichikawa et al.

[11] Patent Number: 4,855,753
[45] Date of Patent: Aug. 8, 1989

[54] METHOD OF INK JET RECORDING AND INK JET RECORDING APPARATUS

[75] Inventors: Kyoko Ichikawa, Tokyo; Makoto Aoki; Hideo Takiguchi, both of Yokohama, all of Japan

[73] Assignee: Canon Kabushiki Kaisha, Tokyo, Japan

[21] Appl. No.: 209,330

[22] Filed: Jun. 20, 1988

[30] Foreign Application Priority Data

Jun. 19, 1987 [JP] Japan .................................. 151337
Sep. 12, 1987 [JP] Japan .................................. 227574
Sep. 25, 1987 [JP] Japan .................................. 240279
Jun. 17, 1988 [JP] Japan .................................. 149876

[51] Int. Cl.$^4$ .......................................... G01D 15/16
[52] U.S. Cl. ................... 346/1.1; 346/140 R; 358/80
[58] Field of Search ............ 346/140, 1.1; 358/80, 358/75

[56] References Cited

U.S. PATENT DOCUMENTS

4,631,578 12/1986 Sasaki ................................... 358/80
4,635,078 1/1987 Sakurada ......................... 346/1.1 X
4,727,436 2/1988 Kawamura ....................... 346/1.1 X Primary Examiner—Joseph W. Hartary
Attorney, Agent, or Firm—Fitzpatrick, Cella, Harper & Scinto

[57] ABSTRACT

Disclosed is a method of ink jet recording for forming a color image including a color-mixed portion by using a plurality of colored inks for at least one of which a plurality of inks having different dyestuff densities are used, the method comprising: compensating OD value data concerning discharge of ink in accordance with a rate of change in the OD value of an image due to a change in the amount of ink supplied and a total amount of ink supplied per picture element. Also disclosed is an ink jet recording apparatus for forming a color image by using a plurality of colored inks and expressing gradations by varying the amounts of inks discharged by using for at least one color a plurality of inks having different dyestuff densities, the ink jet recording apparatus comprising: a device for outputtting a compensating value in which an increment in the OD value during mixing of colors is subtracted on the basis of information on a total amount of the inks to be discharged, information on which of the plurality of the inks having the different dyestuff densities is to be used, and information on the OD value of the ink.

7 Claims, 6 Drawing Sheets

METHOD OF INK JET RECORDING AND INK JET RECORDING APPARATUS

BACKGROUND OF THE INVENTION

1. Field of the Invention

The present invention relates to a novel method of ink jet recording and an ink jet recording apparatus that are capable of forming full-color images which are free from the occurrence of pseudo-contours and are higher in picture quality.

2 Description of the Related Art

A method of ink jet recording is used to record an image or the like by discharging droplets of ink from nozzles of a recording head by causing these droplets of ink to be absorbed by a recording material such as paper or cloth. The amount of noise generated according to this method is small, and no particular fixing treatment is required, and it is capable of effecting high-speed recording and full-color recording.

The full-color recording is effected by subjecting the three colors of yellow (Y), magenta (M), and cyan (C), or four colors with black (K) added thereto to subtractive mixing of colors. Namely, full-color recording is effected by discharging the three colored inks or four colored inks with black (K) added thereto from nozzles used exclusively for the respective colors of the recording head while the respective amounts of the colored inks to be discharged are being controlled, and by allowing the respective inks to be mixed and absorbed by each picture element of the recording material.

For instance, in a conventional printer in which cylindrical piezoelectric elements are used in a printer head of an ink jet system, the gradations of density can be expressed by changing the diameter of the dots to be printed on the recording sheet.

Meanwhile, since the ratio of change between a maximum dot and a minimum dot is not very large, there are cases where areas having a sufficient density are lacking to output a natural color image. Accordingly, a low-density ink and a high-density ink both of the same color are prepared for each color, and the high- and low-density inks are selectively used by changing over the heads in accordance with the high- and low-density areas, thereby securing areas having necessary densities, as disclosed in, for example, U. S. Pat. Nos. 4,551,736, 4,533,920, 4,533,923, and 4,695,846.

However, a problem has newly arisen in that differences in color emerge as between cases where a low-density ink and an ink of another color are discharged to a specific position on the recording paper and cases where a high-density ink of the same color as that of the low-density ink and an ink of another color are discharged thereto.

In other words, if the high- and low-density inks are changed over when a color is changing smoothly in an output image, pseudo-contours occur in that changed-over portion, with the result that the image becomes disadvantageously unnatural.

SUMMARY OF THE INVENTION

Accordingly, an object of the present invention is to provide a novel method of ink jet recording which is capable of substantially eliminating pseudo-contours resulting from the mixing of colors and of obtaining a high-quality image, thereby overcoming the drawbacks of the prior art.

To this end, according to one aspect of the present invention, there is provided a method of ink jet recording for forming a color image including a color-mixed portion by using a plurality of colored inks for at least one of which a plurality of inks having different dyestuff densities are used, the method comprising: compensating OD value data concerning discharge of ink in accordance with a rate of change in the OD value of an image due to a change in the amount of ink supplied and a total amount of ink supplied per picture element.

According to another aspect of the present invention, there is provided an ink jet recording apparatus for forming a color image by using a plurality of colored inks and expressing gradations by varying the amounts of inks discharged by using for at least one color a plurality of inks having different dyestuff densities, the ink jet recording apparatus comprising: means for outputting a compensating value in which an increment in the OD value during mixing of colors is subtracted on the basis of information on a total amount of the inks to be discharged, information on which of the plurality of the inks having the different dyestuff densities is to be used, and information on the OD value of the ink.

The above and other objects, features and advantages of the present invention will become apparent from the following description of the invention when read in conjunction with the accompanying drawings.

DESCRIPTION OF THE PREFERRED EMBODIMENTS

It has been found that one cause of the occurrence of the above-described pseudo-contours is attributable to the phenomenon of a local rise in the OD (optical density) value of each color caused by an increase in the amount of solvent contained in the ink occurring in a picture element during the mixing of colors.

In addition, in a method of full-color ink jet recording, in order to realize a prescribed OD value, it is necessary to selectively use a high-density ink and a low-density ink both of the same color in view of the relationship with the amount of ink discharged, and recording is effected by mixing the high-, and low-density inks to realize a certain OD value (an area where the reproduction density of the low-density ink overlaps with that of the high-density ink). In this OD value area, the size of a dot to be recorded in a recording material is made small in the high-density ink, while that of the low-density ink is made large. Accordingly, small dots of the high-density ink and large dots of the low-density ink are mixed in an image in which both the high- and low-density inks are present in a mixed form. Conceivably, the cause of the occurrence of the pseudo-contours is attributable to a difference in the tendency of an increase in the abovedescribed OD value.

Figure 5:
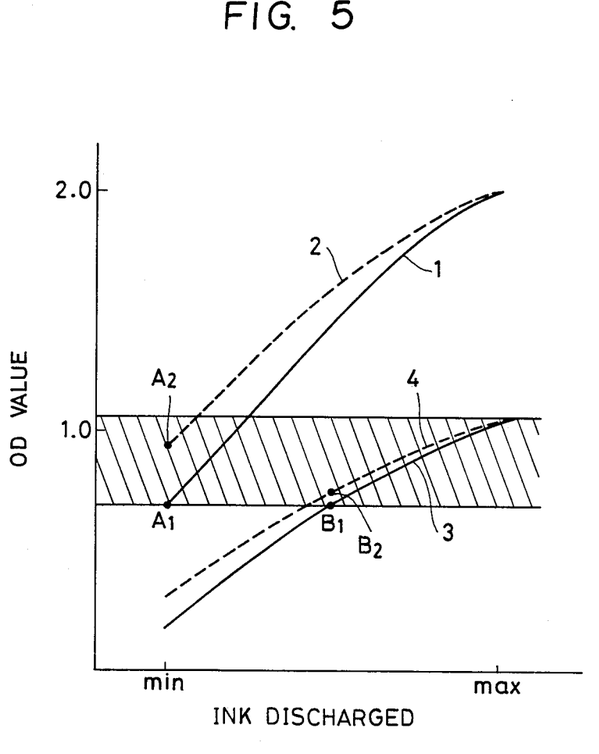
FIG. 5 is a graph illustrating the relationship between the OD value and an amount of ink discharged.

Referring now to FIG. 5, a description will be given of the aforementioned phenomenon.

FIG. 5 is a graph illustrating the relationship between the amount of ink discharged and the OD value. In the graph, reference numeral 1 shows a case where the high-density ink is recorded in a single color; 2 shows a case where recording is effected by overlaying a solvent alone on the high-density ink discharged, in such a manner that the total amount of ink per picture element becomes equivalent to the maximum amount of absorption by the sheet; 3 shows a case where the low-density ink is recorded in a single color; 4 shows a case where recording is effected by overlaying the solvent on the low-density ink.

As is apparent from a comparison between curves 1 and 2 or between curves 3 and 4, it can be appreciated that, as the amount of the solvent increases, the OD value tends to increase, and that there is a difference in the rate of increase between the high- and low-density inks. For instance, in the graph, OD values $A_1$ and $B_1$, which are equivalent when recording is effected in a single color, respectively change to $A_2$ and $B_2$ as the amount of the solvent is increased. Hence, it can be appreciated that a difference arises in the rate of increase in the OD value between the high- and low-density inks during the mixing of colors, i.e., when inks of different colors are overlapped on each other.

The phenomenon in which an increase in the amount of the solvent results in an increase in the OD value and the cause for the difference arising in the rate of increase in the OD value depending on the density of the ink are conceivably attributable to the following:

If a solvent is added to a recorded dot, the diameter of the dot expands. Namely, the distribution of pigments that are present in a high density in a spot of the recording material expands extensively. Since the OD value is an intensity which is related to a type of reflection and is inherent to the pigments, the expansion of the distribution of the pigments results in an increase in the area of pigments of a certain intensity. Hence, the OD value per unit area increases. In the case of the high-density ink, it is considered that this phenomenon appears more noticeably since the amount of pigments contained therein is large as compared with the low-density ink.

Conventionally, image processing has been performed without taking this increase in the OD value into consideration, the amount of solvent increases when different colors are mixed, with the result that a local increase has occurred in the OD value per picture element, resulting in the occurrence of pseudo-contours.

In the present invention, the increase in the OD value with an increase in the amount of solvent during the mixing of colors is taken into consideration, so that it makes it possible to restrain the occurrence of pseudo-contours during the formation of an image by compensating the OD value data relating to the ink discharged.

A detailed description of the present invention will be given hereafter on the basis of an embodiment.

Figure 6:
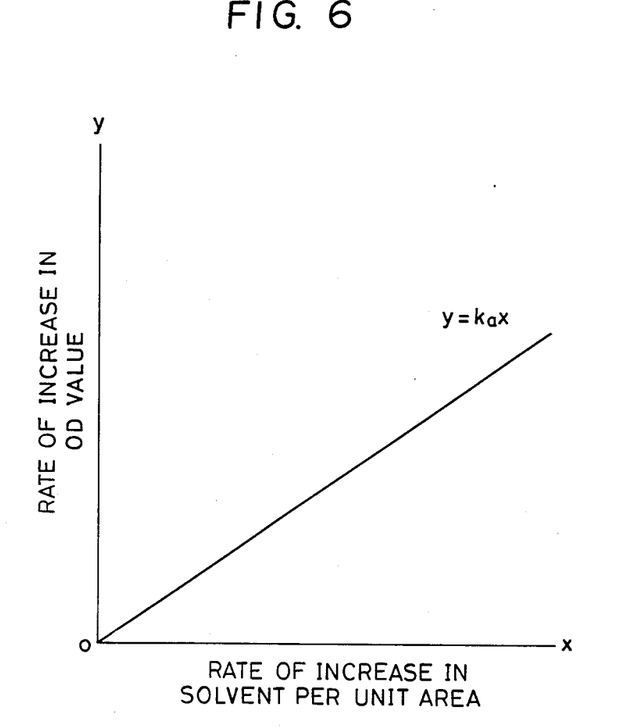
FIG. 6 is a graph illustrating the relationship between a rate of increase in the OD value and a rate of increase in a solvent in accordance with an embodiment of the present invention.

FIG. 6 is a graph illustrating the relationship between the rate of increase in a solvent in a certain color and the rate of increase in the OD value as the amount of the solvent is increased. In the graph, the rate of increase in the solvent per unit area, x, is plotted along the abscissas, while the rate of increase in the OD value, y, is plotted along the ordinates.

It has been verified through an experiment that the rate of increase in the OD value, y, and the rate of increase in the solvent, x, are in an approximately proportional relationship. Accordingly, if this relationship is expressed by a formula, the following formula holds:

$$Y = k_a x \tag{1}$$

where $k_a$ is a proportional constant in a color (any one of the colors Y, M, C and K).

In addition, since the proportion of the dyestuffs (solute) contained in ink is very small, if the amount of solvent is approximated by the amount of ink discharged, the rate of increase in the solvent, x, can be expressed as follows:

$$x = (x_{s0} - x_{a0})/x_{a0} \tag{2}$$

where $x_{s0}$ is an amount of the total ink discharged per unit area, and $x_{a0}$ is an amount of ink of a color a discharged per unit area.

Furthermore, the rate of increase in the OD value can be expressed as:

$$y = (y_{a1} - y_{a0})/y_{a0} \tag{3}$$

where $y_{a1}$ is the OD value when $y_{a0}$ increases upon being influenced by the solvent, and $y_{a0}$ is the OD value when printing is effected with the single color of a. From Formulae (1), (2) and (3), the following formula holds:

$$(y_{a1} - y_{a0})/y_{a0} = k_a(x_{s0} - x_{a0})/x_{a0} \tag{4}$$

Since the OD value of an image actually recorded is increased owing to the influence of an increase in the amount of solvent, to obtain a recorded image of the OD value $y_{a1}$ it is necessary that the OD value data to be input to the head driving circuit for driving the recording head be $ya_0$.

Namely, the desired OD value $ya_1$ is realized by inputting the value $ya_1'(ya_0)$ compensated by the formula shown below, to the head driving circuit. Namely, by modifying Formula (4), we have $$ya_1'(ya_{0'}) = ya_1/\{k_a(x_{s0} - x_{a0})/x_{a0} + \} \quad (5)$$

In Formula (5), if it is assumed that $x_{s0} \equiv Qs$, $x_{a0} \} Qa$, and $ya_1 \equiv Da$, Formula (5) can be expressed as follows:

$$Da' = Da/\{k_a(Qs - Qa)/Qa + 1\} \quad (6)$$

where Da is a conventional input signal for the color a, i.e., the OD value prior to compensation; Da' is an input. OD value after compensation; Qs is the total amount total of ink discharged per picture element; and Qa is an amount of ink of the color a discharged.

Figure 1:
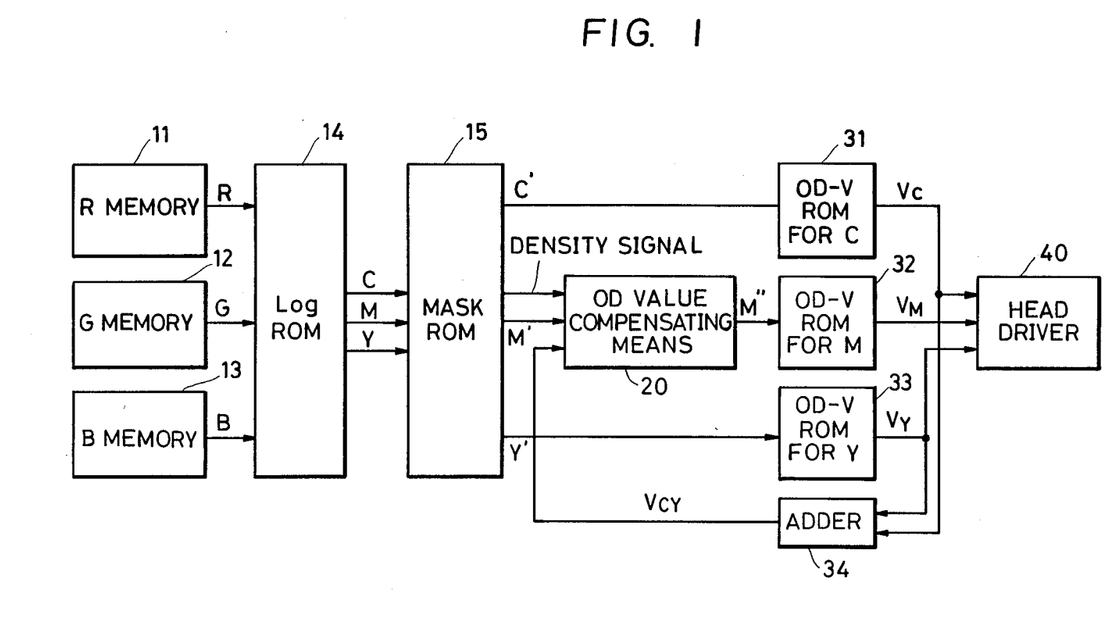
FIG. 1 is a block diagram of an image processing circuit in accordance with an embodiment of the present invention.

FIG. 1 is an image processing circuit illustrating an embodiment of the present invention.

In this embodiment, to simplify the description, an ink jet recording apparatus is shown in which high- and low-density inks are used for magenta alone among the three colors of cyan, magenta and yellow, and an ink of one kind of density is used for cyan and yellow.

In this embodiment, the ink jet recording apparatus comprises: an R memory 11, a G memory 12, and a B memory 13 for storing image data; a Log ROM 14 for converting an image data into OD value; a mask ROM 15 for color-compensating an OD value; an OD value compensating means 20; an OD-V ROM 32 for cyan, an OD-V ROM 32 for magenta, and an OD-V ROM 33 for yellow respectively adapted to convert a color-compensated OD value into a voltage to be applied to the head; an adder 34 for adding a voltage Vc to be applied to a head for cyan and a voltage Vy to be applied to a head for yellow; and a head driver 40.

The OD value compensating means 20 is an example of means for outputting a compensation value in which an increment in the OD value during the mixing of colors is subtracted, on the basis of information on the total amount of ink to be discharged to prescribed positions, information on which of the inks has been used among a plurality of inks which are of the same color and have different dyestuff densities, and information on the OD value of the inks.

A description will now be given of the operation of the above-described embodiment.

First, image data stored in the R, G and B memories 11, 12, 13 are converted into OD values C, M, Y in the Log ROM 14, and are subjected to color compensation by the mask ROM 15 which outputs C', M', Y', and a density signal (a signal representing which of the high- and low-density inks is to be used as the magenta ink). The color-compensated OD values C', Y' are respectively converted into voltage values by OD-V ROMs 31, 33. The converted voltages Vc, Vy are added by the adder 34, and a result Vcy of this addition is input to the OD value compensating means 20.

The OD value compensating means 20 is constituted by a ROM, and a color-compensated OD value M' and an output signal of the adder 34 are input thereto, on the basis of which the OD value compensating means 20 outputs a compensation value M''. This compensation value M'' is converted into a voltage value. Thus, voltages Vc, Vm, Vy are sent to the head driver 40, which in turn drives heads (not shown) to discharge the inks.

The voltage value applied to the head and the amount of ink solvent are in a proportional relationship, and, assuming that the amount of ink solvent at 25V at which the minimum dot is jetted is 1, the amount of ink solvent at 75V at which the maximum dot is jetted is 3.

Accordingly, if the voltage value is assumed to be V (V is 25 to 75), the amount of ink discharged, $X_0$, can be expressed by the following formula (7):

$$X_0 = (V - 25) \times 2/(75 - 25) + 1 \quad (7)$$

The amount of ink solvent can be determined from Formula (7), the rate of increase in the solvent can be determined from Formula (2), and the rate of increase in the OD value can be determined form Formula (1). Hence, the OD value $y_{af}$ which has increased as the result of mixing of colors can be determined from Formula (3).

Accordingly, to obtain the OD value $ya_l$, it suffices if an amount of ink equivalent to the OD value $ya_0$ is jetted.

A method of determining Ka will be described later.

In the above-described embodiment, what is required for determining a compensation coefficient of magenta when, for instance, magenta and yellow are mixed is information on the OD value of magenta, information on which of the high- and low-density inks of magenta is to be discharged, and driving voltage values prior to the compensation of magenta and yellow, and from these items of information it is possible to prepare a ROM table for outputting a compensating OD value for magenta.

Figure 2:
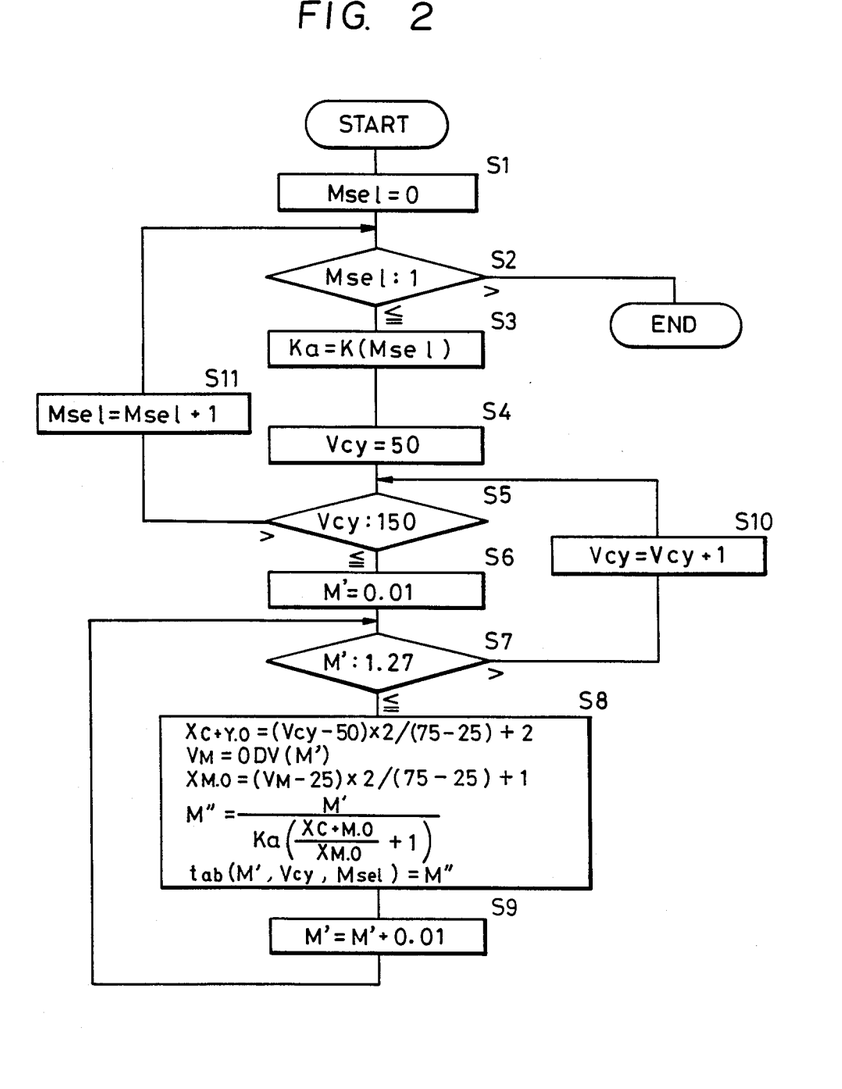
FIG. 2 is a flowchart illustrating the operation of writing a table in an OD value compensating ROM which is an example of OD value compensating means in the aforementioned embodiment.

FIG. 2 is a flowchart illustrating an operation in which a table is written in the OD value compensating ROM, which is an example of the OD value compensating means 20 in the above-described embodiment.

In this flowchart, K(0) represents a coefficient for increasing the OD value for the low-density magenta ink; K(1) represents a coefficient for increasing the OD value; ODV (M') represents a table for converting the OD value of magenta into a voltage value; and tab (M', Vcy, Msel) represents data to be written into the OD value compensating ROM. Incidentally, the density signal Msel representing the density of magenta is normally 0 or 1; Vcy is in the range of 50 to 150; and M' varies in the range of 0.01 to 1.27.

First, of the high- and low-density inks, a table is compiled with respect to the low-density ikk (Step S1). In this case, the coefficient of increasing the OD value for the low-density magenta ink is set to Ka (Step S3), Vcy is set to 50 (Step S4), the OD value M' for magenta is set to 0.01 (Step S6), and the operation proceeds to Step S8.

In this Step S8, a sum $X_{c+Y,o}$ of two color components of cyan and yellow is determined on the basis of Formula (7), and the voltage value Vm is determined from the OD value M' of magenta with reference to the table. After $X_{M,O}$, x, y are determined, and $Y_{M,1}(D_M')$ is then determined on the basis of the table tab (M', Vcy, Msel). Subsequently, M' is incremented by 0.01 (Step S9), and the operation of the above-described Step S8 is then repeated. In this case, when M' becomes 1.27 or more, Vcy is incremented by 1 (Step S10), and the above-described operation is then repeated. If Vcy becomes 150 or more (Step S5), Msel is incremented by 1 (Step S11), and the foregoing operation is repeated.

The above-described embodiment is a case where the high- and low-density inks are used for magenta alone, but a similar procedure is taken when high- and low-density inks are used for cyan or yellow. Also, a case where high- and low-density inks are used for a plurality of colors of cyan, magenta, and yellow can be explained in a similar manner.

Figure 3:
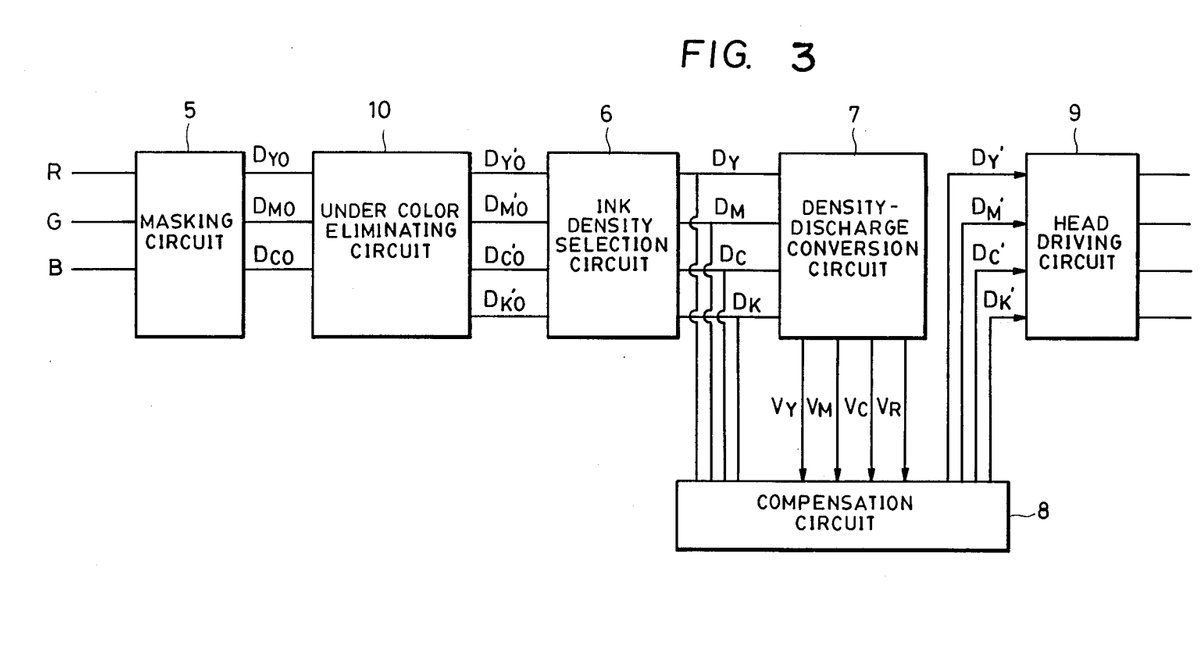
FIG. 3 is a block diagram of an image processing circuit in accordance with another embodiment of the present invention.

FIG. 3 illustrates an image processing circuit in accordance with this embodiment.

In FIG. 3, a masking circuit 5 effects masking of input R, G, B signals; an under color eliminating circuit 10 fetches an uncolored component K, which is a common component of the signals $D_{Y0}$, $D_{M0}$, $D_{C0}$, to obtain respective Signals $D_{Y0}'$, $D_{M0}'$, $D_{C0}'$, $D_{K0}'$ from the signals $D_{Y0}$, $D_{M0}$, $D_{C0}$; an ink density selection circuit 6 selects the density of each ink for effecting recording on the basis of respective OD value signals; and a density-discharge conversion circuit 7 sets an amount of discharge of each color in response to the OD Value signals $D_Y$, $D_M$, $D_C$, $D_k$ of the respective colors from the ink density selection circuit 6.

A compensation circuit 8, which constitutes a feature of the present invention, effects compensation on the basis of the compensating formula shown in Formula () in response to the OD Value signals $D_Y$, $D_M$, $D_C$, $D_K$ of the respective colors from the ink density selection circuit 6 and ink discharge signals $V_Y$, $V_M$, $V_C$, $V_K$ of the respective colors from the density-discharge conversion circuit 7. A head driving circuit 9 outputs signals representing amounts of inks to be discharged to the recording heads on the basis of the relationship such as the one shown in Fig. 3 from OD value signals $D_Y'$, $D_M'$, $D_C'$, $D_K'$ for the respective colors compensated by the compensation circuit 8.

Figure 4:
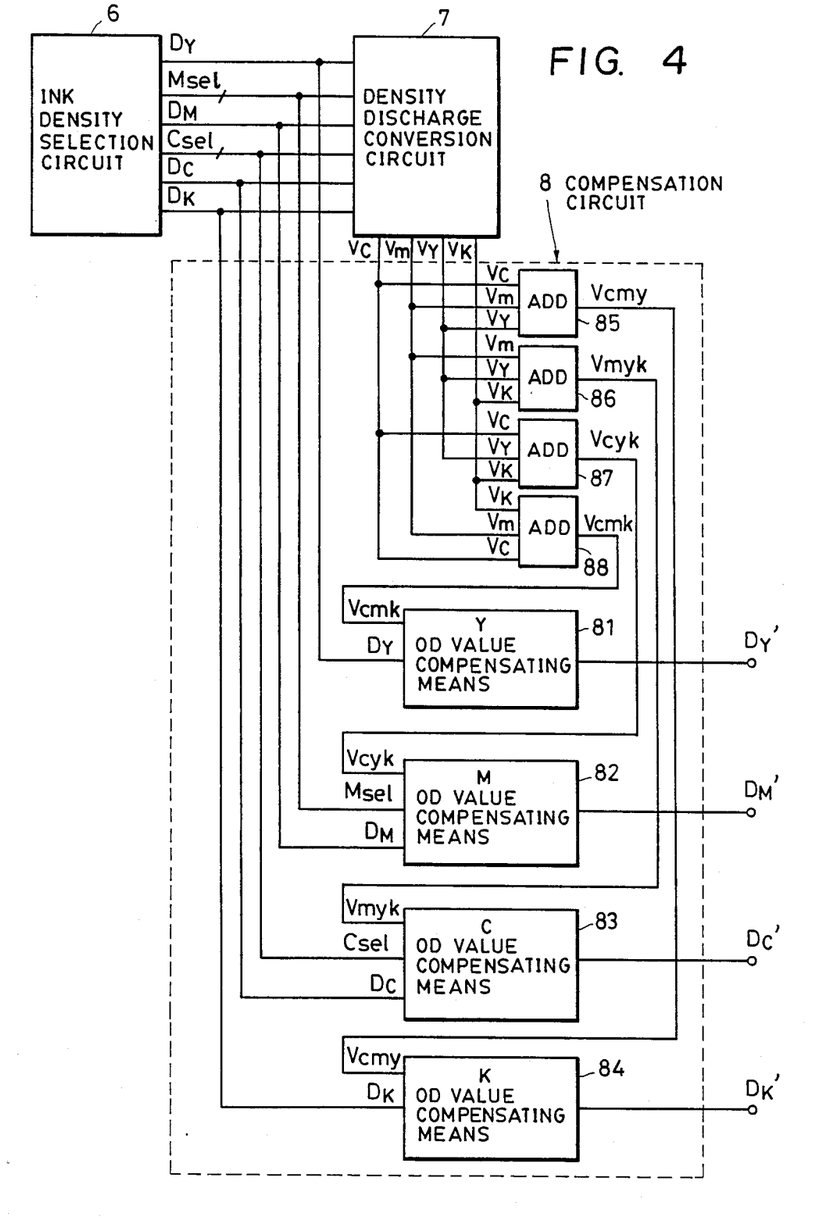
FIG. 4 is a detailed explanatory diagram of a compensation circuit shown in FIG. 3.

FIG. 4 is a detailed explanatory diagram of the circuit 8 shown in FIG. 3. Signals Vy, Vm, Vc, Vk output from the circuit 7 are supplied to circuits 85–88 which perform the calculation of Formula (2) and respectively output signals Vcmy, Vmyk, Vcyk, Vcmk to circuits 81 to 84. These circuits 81 to 84 perform the calculation of Formula (6) together with the OD value data sent from the circuit 6, thereby obtaining compensation values $D_Y'$, $D_M'$, $D_C'$, $D_K'$.

Examples will now be described for determining the proportional constant ka in the compensating Formula (6).

EXAMPLE 1

An uncolored ink having a composition described below was prepared, dyestuffs were then added to it, and respective high- and low-density inks of the four colors of yellow, magenta, cyan, and black were prepared. Composition ratio of the uncolored ink:

| Water: | 50 parts by weight |
| Diethylene glycol: | 30 parts by weight |
| N—methyl-2-pyrolidone | 10 parts by weight |

| Ink No. | Ink | Dyestuff | Weight Percent |
|---|---|---|---|
| 1 | Yellow ink Y | CI direct yellow 86 | 0.8 wt % |
| 2 | Low-density magenta ink Md | CI acid red 35 | 0.4 wt % |
| 3 | High-density magenta ink Mc | CI acid red 35 | 1.2 wt % |
| 4 | Low-density cyan ink Cd | CI direct blue 86 | 0.4 wt % |
| 5 | High-density cyan ink Cc | CI direct blue 86 | 1.2 wt % |
| 6 | Black ink K | CI food black 2 | 2.0 wt % |

Taking as an example the high-density magenta ink (ink No. 3) among the above-described inks, recording was effected with respect to the high-density magenta ink at the driving voltages of 25V, 50V and 75V by using a piezo jet printer. At that juncture, recording was effected by overlaying a solvent, i.e., an uncolored ink, on the respective recorded image at voltages of 0V, 25V, 50V, 75V, 75+50V, and the OD value was measured with respect to the samples obtained. Since the drive voltage and the amount of the ink discharged are in a proportional relationship, the voltage was converted into an amount of discharge, and an increment $Q_2/Q_1$ of an amount of solvent $Q_2$ was calculated with respect to an amount of high-density magenta ink $Q_1$. Namely, calculation was made by setting the amount of discharge at the driving voltage 25(V) as 1. In addition, the rate of increase in the density accompanying an increase in the amount of solvent at the time of single-color printing was calculated. This result is shown in Table 1.

Since it was assumed that the rate of increase in the solvent and the rate of increase in the density are in a linear relationship, when $k_{Mconc}$ was determined from the value of these two rates of Table 1 by using the method of least squares, $k_{Mconc}$ equaled 8.2.

The measurement of the OD value was carried out With respect to an image recorded at a recording density of 170 dpi by using a remodeled ink jet printer RP-601 (made by Canon Inc.) and a high-speed spectrophotometer Model CA-35 (made by Murakami Shikisai Gijutsu Kenkyusho).

TABLE 1

| High-density magenta ink | | Solvent | | | Rate of increase in solvent $Q_2/Q_1$ | Rate of increase in OD Value % |
|---|---|---|---|---|---|---|
| Drive voltage (V) | Discharge $Q_1$ | Drive voltage (V) | Discharge $Q_2$ | OD Value | | |
| | | 0 | 0 | 0.41 | 0 | 0 |
| | | 25 | 1 | 0.44 | 1 | 7.3 |
| 25 | 1 | 50 | 2 | 0.48 | 2 | 17.1 |
| | | 75 | 3 | 0.52 | 3 | 26.8 |
| | | 75 + 50 | 5 | 0.58 | 5 | 41.5 |
| | | 0 | 0 | 0.88 | 0 | 0 |
| | | 25 | 1 | 0.94 | 0.5 | 6.8 |
| 50 | 2 | 50 | 2 | 0.97 | 1 | 10.2 |
| | | 75 | 3 | 1.01 | 1.5 | 14.8 |
| | | 75 + 50 | 5 | 1.03 | 2.5 | 17.0 |
| | | 0 | 0 | 1.25 | 0 | 0 |
| | | 25 | 1 | 1.29 | 0.3 | 3.2 |

TABLE 1-continued

| High-density magenta ink | | Solvent | | OD Value | Rate of increase in solvent $Q_2/Q_1$ | Rate of increase in OD Value % |
|---|---|---|---|---|---|---|
| Drive voltage (V) | Discharge $Q_1$ | Drive voltage (V) | Discharge $Q_2$ | | | |
| 75 | 3 | 50 | 2 | 1.32 | 0.7 | 5.6 |
| | | 75 | 3 | 1.35 | 1 | 8.0 |
| | | 75 + 50 | 5 | 1.40 | 1.7 | 12.0 |

In a similar manner, the constant $k_a$ representing the relationship between the OD value and the amount of discharge was obtained with respect to each of the other colored ink as well.

TABLE 2

| $k_{Mdil}$ | 4.1 |
|---|---|
| $k_Y$ | 2.7 |
| $k_{Cconc}$ | 3.8 |
| $C_{Cdil}$ | 1.3 |
| $k_K$ | 7.9 |

When compensation was effected for the respective inks by using the aforementioned constants in accordance with the present invention, and a patch was obtained in which two colors of magenta ($D_M$) and cyan ($D_C$) were mixed with the input data Da set at 0.88 for the former color and 0.45 for the latter color. As for $D_M$ of 0.88, it is necessary to use a dark-density ink and 2 is required for an amount of ink $Q_M$. As for $D_C$ of 0.45, it is necessary to use a light-density cyan ink and 2 is necessary for an amount of ink $Q_C$. These data are summarized into the following table.

| | Da | ka | Qs–Qa | Qa |
|---|---|---|---|---|
| Magenta | 0.88 | 8.2 | 2 | 2 |
| Cyan | 0.45 | 1.3 | 2 | 2 |

If the aforementioned values are substituted in Formula (6), we have $D_M' = 0.81$ $D_C' = 0.44$ Thus the compensation values $D_M'$ and $D_C'$ can be determined.

When a patch was obtained by setting the input data (Da') as $D_M'=0.81$ and $D_C'=0.44$, and when the OD values were measured, OD values having the magenta component of 0.88 and the cyan component of 0.45 were obtained, as desired. In actual images, pseudo-contours were substantially eliminated, so that the image quality improved substantially.

EXAMPLES 2-5

Inks of different densities were prepared by using the same dyestuffs as those of Example 1, and the constants ka were determined as shown in Table 3.

TABLE 3

| Ink Color | Density wt % | $k_a$ | Ink No. |
|---|---|---|---|
| Yellow | 0.3 | 1.3 | 7 |
| | 1.0 | 3.0 | 8 |
| Magenta | 0.3 | 3.1 | 9 |
| | 0.6 | 4.2 | 10 |
| | 1.0 | 7.1 | 11 |
| Cyan | 0.3 | 1.3 | 12 |
| | 0.6 | 1.4 | 13 |
| | 1.0 | 3.8 | 14 |
| Black | 0/7 | 4.5 | 15 |
| | 2.5 | 8.3 | 16 |

When a color image was formed using Y, M, C, and Bk inks by combining, as shown in Table 4, the inks each for which the constant $k_a$ was determined in Examples 2 to 5, desired OD value were obtained in the same way as Example 1, and in actual images, pseudo-contours were substantially alleviated, and the image quality improved remarkably.

As is apparent from the foregoing, if the OD value data concerning the discharge of ink is compensated by taking into account a rise in the OD value resulting from an increase in the amount of solvent during mixing of colors, it is possible to obtain a desired OD value during image formation.

TABLE 4

| Example | Yellow (Ink No.) | Magenta (Ink. No.) | Cyan (Ink No.) | Black (Ink No.) |
|---|---|---|---|---|
| 2 | 7, 8 | 2, 3 | 4, 5 | 15, 16 |
| 3 | 1 | 9, 10, 11 | 12, 13, 14 | 16 |
| 4 | 7, 8 | 9, 10, 11 | 12, 13, 14 | 15, 16 |
| 5 | 1 | 9, 10, 3 | 12, 13, 5 | 6 |

Consequently, the advantage was obtained that pseudo-contours are substantially eliminated, thereby improving the picture quality.

Comparative Example 1

A patch in which two colors of Example 1 were mixed was prepared without performing compensation. Subsequently, the OD value of the patch was found to be 0.97 for the magenta component and 0.46 for the cyan component, and the patch was more reddish than the desired color.

What is claimed is:

1. A method of ink jet recording for forming a color image including a color-mixed portion by using a plurality of colored inks for at least one of which a plurality of inks having different dyestuff densities are used, said method comprising:
    compensating OD value data concerning discharge of ink in accordance with a rate of change in the OD value of an image due to a change in the amount of ink supplied and a total amount of ink supplied per picture element.

2. A method of ink jet recording according to claim 1, wherein said OD value data concerning the discharge of said ink is compensated in accordance with the following formula:

$Da' = Da/\{Ka(Qs-Qa)/Qa+1\}$ where a: kind of ink

Ka: coefficient concerning the rate of increase in the OD value of ink a

Da: OD value of ink a prior to compensation

Da': OD value of ink a after compensation

Qs: Total amount of ink discharged per picture element

Qa: amount of ink a discharged per picture element

3. A method of ink jet recording according to claim 1, wherein, of said plurality of colored inks, said plurality of inks having different dyestuff densities are used as magenta ink.

4. A method of ink jet recording according to claim 1, wherein, of said plurality of colored inks, said plurality of inks having different dyestuff densities are used as cyan ink.

5. An ink jet recording apparatus for forming a color image by using a plurality of colored inks and expressing gradations by varying the amounts of inks discharged by using for at least one color a plurality of inks having different dyestuff densities, said ink jet recording apparatus comprising: means for outputting a compensating value in which an increment in the OD value during mixing of colors is subtracted on the basis of information on a total amount of said inks to be discharged, information on which of said plurality of said inks having said different dyestuff densities is to be used, and information on the OD value of said ink.

6. An ink jet recording apparatus according to claim 5, wherein said plurality of inks having said different dyestuff densities are used as magenta ink.

7. An ink jet recording apparatus according to claim 5, wherein said plurality of inks having said different dyestuff densities are used as cyan ink.

* * * * *

UNITED STATES PATENT AND TRADEMARK OFFICE
CERTIFICATE OF CORRECTION

PATENT NO. : 4,855,753

DATED : August 8, 1989

INVENTOR(S) : KYOKO ICHIKAWA, ET AL.

Page 1 of 3

It is certified that error appears in the above-identified patent and that said Letters Patent is hereby corrected as shown below:

COLUMN 3

Line 20, "abovedescribed" should read --above-described--.

COLUMN 4

Line 34, "$Y=k_a x \qquad (1)$" should read --$y=k_a x \qquad (1)$--.

Line 36, "color" should read --color a--.

Line 54, "$y=(ya_1-ya_0)/ya_0 \qquad (3)$" should read --$y=(Y_{a1}-Y_{a0})/Y_{a0} \qquad (3)$--.

Line 56, "$ya_1$" should read --$Y_{a1}$-- and "$ya_0$" should read --$Y_{a0}$--.

Line 57, "yaO" should read --$Y_{a0}$--.

Line 62, "$(ya_1-ya_0)/ya_0=k_a(x_{s0}-x_{a0})/x_{a0}$" should read --$(Y_{a1}-Y_{a0})/Y_{a0}=k_a(x_{s0}-x_{a0})/x_{a0}$--.

Line 67, "$ya_1$" should read --$Y_{a1}$--.

COLUMN 5

Line 2, "$ya_0$." should read --$Y_{a0}$.--.

Line 3, "$ya_1$" should read --$Y_{a1}$--.

Line 4, "yal'($ya_0$)" should read --$Y_{a1}(Y_{a0})$,--.

Line 5, "Namely," should read --That is,--.

Line 7, "$ya_1'(ya_0)=ya1/\{k_a(x_{s0}-x_{a0})/x_{a0}+\}$" should read --$Y_{a1}(Y_{a0})=Y_{a1}/\{k_a(x_{s0}-x_{a0})/x_{a0}+1\}$--.

Line 9, "$x_{a0}\}Qa$," should read --$x_{a0}\equiv Qa$,--.

Line 10, "yal≡Da," should read --$Y_{a1}\equiv Da$,--.

Line 17, "input." should read --input--.

Line 18, "total" should be deleted.

Line 33, "OD-V ROM 32 for cyan," should read --OD-V ROM 31 for cyan,--.

UNITED STATES PATENT AND TRADEMARK OFFICE
CERTIFICATE OF CORRECTION

PATENT NO. : 4,855,753

DATED : August 8, 1989

INVENTOR(S) : KYOKO ICHIKAWA, ET AL.

It is certified that error appears in the above-identified patent and that said Letters Patent is hereby corrected as shown below:

COLUMN 6

Line 21, "form" should read --from--.
Line 22, "$y_{a1}$which" should read --$y_{a1}$ which--.
Line 25, "$ya_1$," should read --$y_{a1}$,--.
Line 26, "$ya_0$" should read --$y_{a0}$--.
Line 57, "ikk" should read --ink--.

COLUMN 7

Line 1, "x, y are determined, and" should read --x and y are determined,--.
Line 25, "Signals" should read --signals--.
Line 31, "OD Value" should read --OD value--.
Line 36, "Formula 0" should read --Formula (6)--.
Line 37, "OD Value" should read --OD value--.

COLUMN 8

Line 45, "With" should read --with--.

COLUMN 9

Line 17, "ink" should read --inks--.

UNITED STATES PATENT AND TRADEMARK OFFICE
CERTIFICATE OF CORRECTION

PATENT NO. : 4,855,753

DATED : August 8, 1989

INVENTOR(S) : KYOKO ICHIKAWA, ET AL.

It is certified that error appears in the above-identified patent and that said Letters Patent is hereby corrected as shown below:

COLUMN 10

TABLE 3, "Black    0/7" should read --Black    0.7--.
Line 17, "OD value" should read --OD values--.

Signed and Sealed this

Sixteenth Day of April, 1991

Attest:

HARRY F. MANBECK, JR.

Attesting Officer      Commissioner of Patents and Trademarks